May 21, 1957    C. W. KUHN ET AL    2,793,328
MOTOR CONTROLLER FOR USE IN EXPLOSIVE AND CORROSIVE ATMOSPHERES
Filed Dec. 14, 1953    3 Sheets-Sheet 1

INVENTORS
CLARENCE W. KUHN
MERLE R. SWINEHART
BY
Attorney

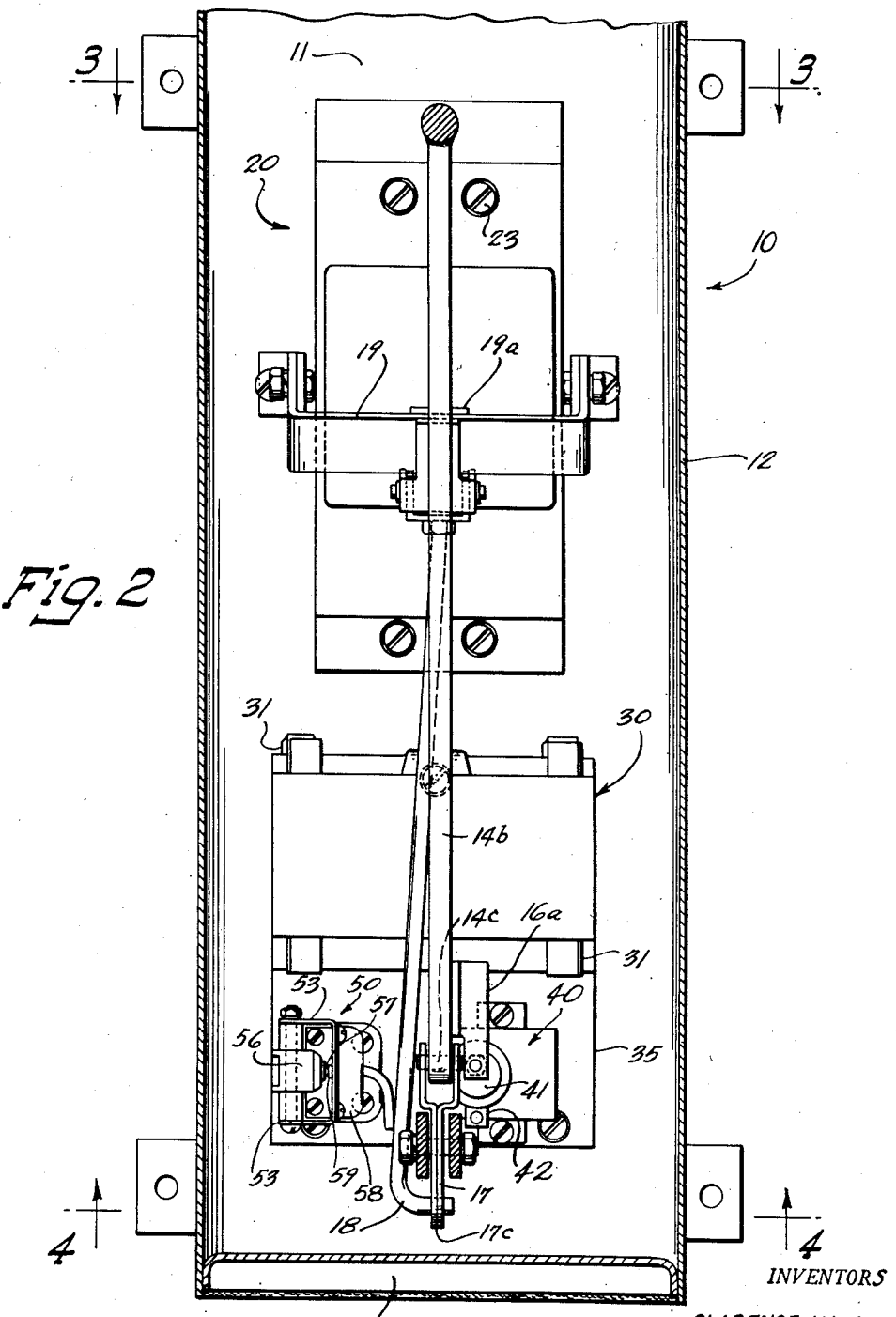

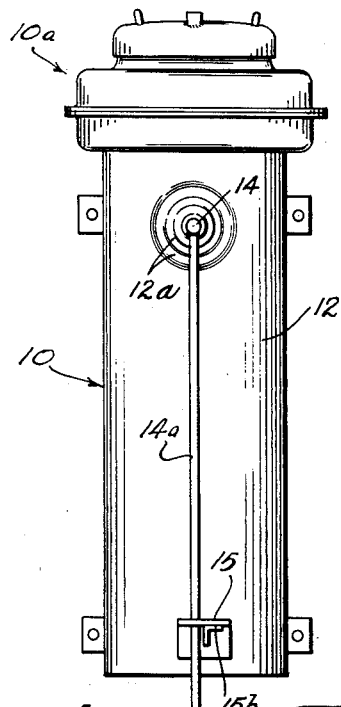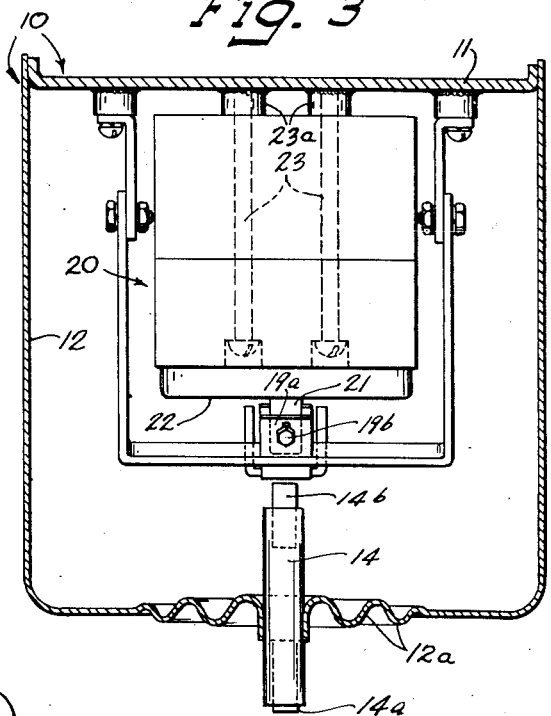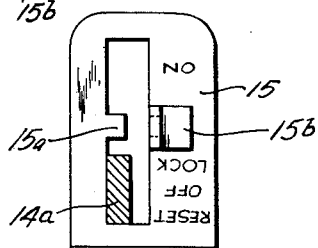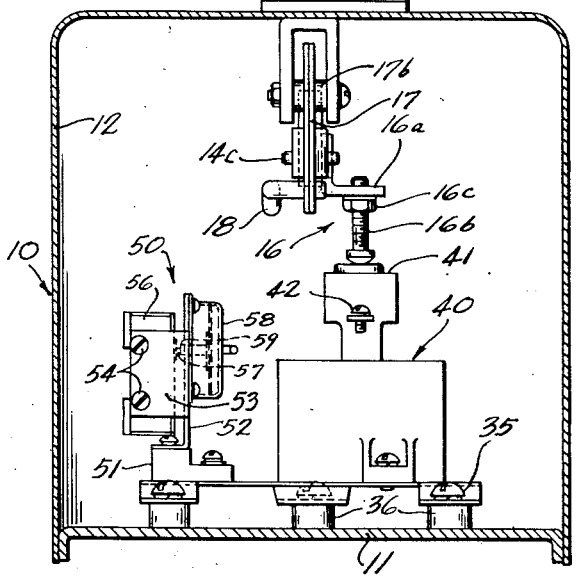

United States Patent Office 2,793,328
Patented May 21, 1957

2,793,328

MOTOR CONTROLLER FOR USE IN EXPLOSIVE AND CORROSIVE ATMOSPHERES

Clarence W. Kuhn, Wauwatosa, and Merle R. Swinehart, Milwaukee, Wis., assignors to Cutler-Hammer, Inc., Milwaukee, Wis., a corporation of Delaware Application December 14, 1953, Serial No. 398,006

5 Claims. (Cl. 317—9)

This invention relates to controllers for electric motors and more particularly to safety type motor controllers which are suitable for use in explosive and corrosive atmospheres.

In the chemical and petroleum industries, for example, it frequently is necessary for motor-driven fans, blowers, pumps, and the like to operate in corrosive atmospheres and/or hazardous locations. In such atmospheres it is impractical to use the conventional type of starter for hazardous locations in which the gas is permitted to enter a casing built strong enough to withstand an internal explosion, the gases issuing from the explosion being sufficiently cooled by the wide and closely fitted flanges on the casing to prevent ignition of the outside explosive atmosphere. Accordingly, where motors have been required to operate in atmospheres both corrosive and explosive it has been the practice to place the controllers for said motors in remotely located control rooms. The obvious disadvantage of such practice has been the enforced separation of the motor from its controller, a circumstance which could prove to be very dangerous if the need for stopping the motor first became apparent to one near the motor.

It therefore is an object of this invention to provide a motor controller which is suitable for use in corrosive as well as explosive atmospheres.

More particularly, it is an object of this invention to provide for a motor controller a hermetically sealed enclosure including mechanical means extending exteriorly of the enclosure for operating a plurality of switch units inside of the enclosure.

It is another object of the invention to provide a manually operated hermetically sealed motor controller with a single external operating member for effecting both actuation of the main switch and resetting of the overload device.

Another object of the inventon is the provision in a hermetically sealed motor controller of means for automatically rendering the controller incapable of completing circuit upon occurrence of a leak in the controller enclosure.

Another object of the invention is to provide a safety type hermetically sealed motor controller which uses standard full-size components.

Other objects and advantages will readily appear to those skilled in the art to which the invention appertains.

A preferred embodiment of the invention is shown in the accompanying drawings, in which:

Fig. 2 is a partly sectioned front elevational view taken along the line 2—2 of Fig. 1;

Fig. 3 is a cross-sectional view, taken along the line 3—3 of Fig. 2, showing the details of the driving connection with the enclosed circuit interrupter;

Fig. 4 is a cross-sectional view, taken along the line 4—4 of Fig. 2, showing the details of the driving connection with the overload switch;

Fig. 5 is a front elevational view in reduced size of the complete hermetically sealed controller, including its terminal compartment; and Fig. 6 is a partly schematic wiring diagram for the sealed controller.

Figure 1:
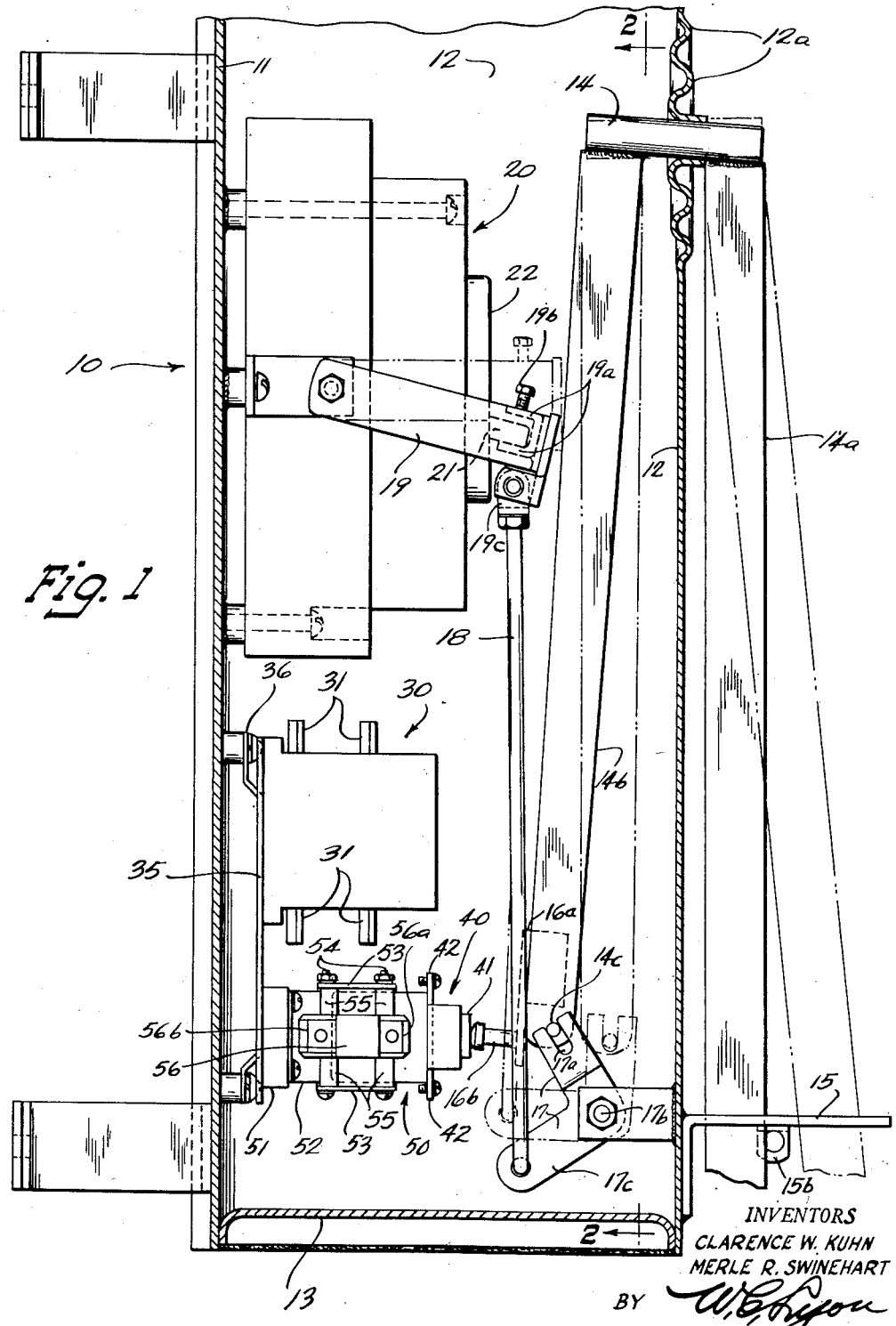
Figure 1 is a side elevational view of the controller with its casing or cover shown in section and the terminal compartment removed. The operating mechanism is shown in the "off-reset" position.

The present invention contemplates the enclosing of a plurality of full-size electrical control elements, enough to provide a complete controller for a motor or other translating device, in a single hermetically sealed enclosure and providing therefor a single external manually operable operating means. The invention further contemplates the provision within said enclosure of automatically operable means for rendering the manually operable means incapable of completing the electrical circuit upon a substantial change in the gas pressure within the enclosure.

In Fig. 1 of the drawings there is shown a substantially rectangular enclosure 10 which preferably is formed of stainless steel or other sheet metal material. Referring also to Figs. 2, 3 and 4, it will be seen that the enclosure 10 comprises a rigid back portion 11 to which is secured by welding or other suitable means a relatively flexible U-shaped member 12 forming the front and side portions of the enclosure. Dish-shaped members 13 are welded to the opposite ends of the members 11, 12 to complete the enclosure.

Referring particularly to Figs. 1 and 2 of the drawings, there are shown a plurality of electrical control units mounted on the rear wall 11 of the sealed enclosure 10. The numeral 20 designates a manually actuated circuit interrupter which may be of any suitable type having an operating handle such as member 21 projecting through its cover 22. Threaded bolts 23 (Figs. 2 and 3) provide a convenient means for attaching the circuit interrupter to the supporting wall 11, through the medium of tapped members 23ᵃ welded or otherwise rigidly attached to the inner surface of said wall.

The numeral 30 designates an electromagnetic contactor having a plurality of terminals 31. The details of the contactor 30, as well as of the other control units, are not shown because said details form no part of the present invention. However anyone familiar with the art to which the invention relates may readily select from the wide variety of commercially available control devices those having the appropriate characteristics.

The numeral 40 designates an overload protection device which is manually reset by means of a pushbutton 41. It includes contacts (not shown) which are connectable in series circuit with the energizing coil of electromagnetic contactor 30 by means of terminals 42. It further includes means for opening said contacts upon the occurrence of predetermined conditions in the main circuit. Like the contactor 30, it also is suitably secured to a mounting plate 35 which in turn may be secured to the back wall 11 of enclosure 10 as by welded pads and bolts 36.

The numeral 50 designates a protective device having contacts (not shown) which are openable upon the occurrence of a predetermined change in the pressure of the atmosphere within the enclosure 10. This device is mounted on an insulating block 51 which is suitably secured to the mounting plate 35. It includes a bracket member 52 having a pair of bent back portions 53 to which is secured by means of bolts 54 and insulating bushings 55 a switch 56. A switch of the well known Micro-Switch type is well adapted for such use and may be mounted with its actuating pin 57 (Figs. 2 and 4) projecting toward the central portion of the bracket 52. A sealed bellows member 58 is fastened to the opposite side of the apertured bracket 52 and has an extended diaphragm mounted actuating boss 59 which abuts the switch actuating pin 57. The bellows may be adjusted and calibrated in a well known manner so as to effect actuation of the switch 56 upon any preselected change in pressure within enclosure 10 to open the circuit connected to the switch terminals 56a, 56b. In this instance, the circuit mentioned is the energizing circuit for the electromagnetic contactor 30. With the latter circuit open it will, of course, be impossible to effect closing of the main circuit. Thus, by placing the gas within the enclosure 10 at a given pressure above atmospheric pressure at the time of assembly and sealing, and adjusting the device 50 so as to open its contacts upon a given drop in said internal pressure, the controller will be rendered incapable of completing circuit should a leak develop in the enclosure 10. Alternatively, by using normally-open instead of normally-closed contacts on the pressure-responsive switch 50, the enclosure may be initially charged at a pressure less than atmospheric so that the controller will be rendered inoperative upon a gain in pressure within the enclosure 10.

The manual operating means for the circuit interrupter 20 and the overload device 40 will now be described. The front wall of the portion 12 of the sheet metal enclosure 10 supports a rigid rod member 14 which is welded to said front wall with its ends extending on opposite sides of said wall. Because of the inherent flexibility of the sheet metal in the front wall portion of member 12 the member 14 is capable of pivotal movement substantially about its point of attachment to said front wall without modification of the cover at said point of attachment. However, the pivotal movement above-mentioned may be further enhanced by stretch-forming the sheet metal (as shown in Figs. 1 and 3) to provide a series of annular undulations 12a about the pivot member 14. The undulations are preferably formed of diminishing height as they extend away from the pivot member 14 and provide a bellows-like portion in the cover member 12 which permits said member 14 to be much more easily moved.

An elongated operating handle 14a is rigidly connected to the outer end of the pivot member 14 with its lower end confined for movement within a slotted bracket member 15. A second elongated operating member 14b is rigidly connected to the inner end of pivot member 14 for arcuate movement with member 14a. In this respect it has been found advantageous to position the members 14a and 14b in slightly divergent directions so as to permit a wider arc of movement with respect to the front portion of the enclosure member 12.

At the lower end of member 14b there is provided an adjustable extension member 16 (see Fig. 4) for engaging and depressing the overload pushbutton 41. It comprises an offset bracket 16a which is rigidly attached to the operating member 14b as shown in Figs. 1, 2, and 4, and a pushbutton engaging member 16b having a threaded connection with the bracket 16a. A locknut 16c (Fig. 4) is provided for maintaining the setting of threaded member 16b, which setting is so selected that the pushbutton 41 will be fully depressed when the arm 14b is moved to its extreme inward position (see Fig. 1).

Having described the manner of effecting manual resetting of the overload device inside the hermetically sealed enclosure, attention will now be directed toward the means for operating the circuit interrupter 20. A bell crank lever 17 is pivotally mounted near the lower end of member 14b for actuation thereby. The upper arm of the bell crank lever 17 is provided with a pair of complementally formed slotted bifurcations 17a (Fig. 1) for receiving a pin 14c (Figs. 1, 2 and 4) transversely mounted on arm 14b to provide a driving connection with said arm. Thus arcuate movement of the pin 14c will cause the bell crank lever 17 to be moved about its pivot 17b. The lower arm 17c of the bell crank lever 17 has a driving connection with a crank rod 18. This may be accomplished by punching a hole in the arm 17c and inserting therein the bent end of rod 18 (Figs. 1, 2 and 4).

The upper end of crank rod 18 is adjustably connected to a pivotally mounted driving bracket 19 (Figs. 1, 2 and 3). Said bracket has a pair of spaced finger-like portions 19a for receiving the circuit interrupter operating handle 21 therebetween. One of said portions 19a is further provided with set screw means 19b to permit adjustment for possible variation in the thickness of the actuating handle 21 employed. The driving bracket 19 is also provided with a threaded socket member 19c which is pivotally mounted thereon and affords a driving connection with the upper threaded end 18b of crank rod 18.

In Figs. 1–4, for purposes of clarity, the wiring connections between the several control devices have not been shown. In Fig. 5, however, it will be seen that a sealed terminal compartment 10a is welded to the top of the enclosure 10. Within said compartment are positioned the several power and control circuit terminals, the circuit wires from which may be led through the top dish-shaped enclosure member 13 aforementioned (not shown).

Referring to Fig. 6, the manner in which the several elements are electrically connected will now be described. Line terminals $L^1$, $L^2$ and $L^3$, located within the terminal compartment 10a, are connected to the line terminals on the circuit interrupter 20 located within the main enclosure 10. From there the line circuit continues through the interrupter 20, thence through the electromagnetic circuit interrupter 30 to the load terminals $M^1$, $M^2$ and $M^3$, also located inside the terminal compartment 10a, the heater coils of overload device 40 being connected in series with two phases of said line circuit.

Control circuit terminals $C^1$ and $C^2$ are also located inside the terminal compartment 10a to permit closing of the control circuit by means of an externally located switch 70. Terminal $C^1$ is directly connected to one of the terminals on the load side of the circuit interrupter 20. Terminal $C^2$ is connected to another of the latter terminals through the coil 30a, the contacts of overload device 40 and the contacts of the safety device 50, which members are each connected in series. Thus the coil 30a will be deenergized and the switch 30 opened to interrupt the main power circuit whenever the contacts in the overload device 40, the safety device 50 or the switch 70 are opened. This provides complete safety protection. If the load M should require an excessive current, the overload device 40 will function to effect opening of the main circuit and protect the load M. If the hermetically sealed enclosure should develop a leak so as to permit the ingress of an explosive mixture, the safety device 50 will function to prevent closing of the main circuit and prevent the possibility of sparks within said enclosure.

Again referring to Figs. 1 through 4, it will be seen that manual operation of the switch 20 and resetting of the overload device 40 is accomplished by movement of operating handle 14a. By placing the handle 14a in the position shown in full lines in Fig. 1 the inner arm 14b is moved to its extreme inward position about a pivot point afforded by flexure of the enclosure cover 12. In said latter position the bracket extension 16b (Figs. 1 and 4) engages and depresses the overload reset button 41, and the pin 14c moves the bell crank arm 17a to its extreme counterclockwise position. In this position the other end 17c of the bell-crank lever 17 causes the crank rod 18 to be lowered whereby the handle 21 of circuit interrupter 20 is also moved to the "reset" position, the latter position being slightly past the "off" position as indicated in Fig. 4.

However, normal manual operation of the controller will not require that the operating arm 14 be moved to the extreme position shown. To move the circuit interrupter to open-circuit position it is only necessary to move the operating arm 14ᵃ from the "on" position (shown in dotted lines in Fig. 1) to a position just past the stop projection 15ᵃ (Fig. 4). In the latter position the overload pushbutton 41 will not be depressed and this will avoid needless wear on said device. To insure against unauthorized operation of the equipment associated therewith the controller may be locked in the "off" position shown by inserting and locking the hasp of a padlock through the opening in the staple or bracket 15ᵇ (Figs. 1, 4 and 5).

From the foregoing description it will be apparent that the present invention provides an improved motor controller which is not adversely affected by use thereof in corrosive atmospheres and which is safe for use in explosive atmospheres. When the controller is assembled as above described both the main circuit interrupter and the overload protection device may be operated by means of a single external operating arm without impairing the gas tight seal provided by the enclosure, and without necessitating unnecessary resetting of the overload device. Also when assembled as aforedescribed the controller will be rendered incapable of completing circuit if its enclosure should develop a leak.

We claim:

1. A motor controller for use in explosive and corrosive atmospheres comprising, in combination, a manually operated circuit interrupter, an electromagnetic contactor connected in series with said circuit interrupter and having an energizing circuit, a pressure responsive switch having contacts which are normally connected in series with said contactor energizing circuit, a hermetically sealed enclosure within which all of the above members are mounted, the gaseous pressure within said enclosure having a normal value which differs from atmospheric pressure, and manual operating means comprising a single member extending exteriorly of said enclosure for operating said circuit interrupter to closed or open position selectively, said pressure responsive switch being operable upon a predetermined change in said gaseous pressure to render said manual operating means incapable of effecting circuit closing should said enclosure develop a leak permitting the entrance of the surrounding atmosphere.

2. A motor controller for use in explosive and corrosive atmospheres comprising, in combination, a manually operated circuit interrupter, other circuit controlling means connected in circuit in series with said interrupter and including an overload protection device requiring manual resetting after overload tripping, a hermetically sealed enclosure within which said interrupter and said overload protection device are mounted, said enclosure having a wall at least a portion of which is free for flexing, an inner operating arm and an outer operating arm mounted on said flexible portion and rigidly connected together for simultaneous pivotal movement on said cover, separately pivoted operating connections between said inner operating arm and said circuit interrupter, and means on said inner operating arm for engaging and resetting said overload device when said operating arm is moved to a given extreme position.

3. In combination, a first circuit interrupter which is manually movable between circuit controlling positions, a second circuit interrupter which is connected in series circuit relation to said first interrupter and is manually closable after automatic tripping, a hermetically sealed enclosure within which said circuit interrupters are mounted, said enclosure having a wall at least a portion of which is free for flexing, an external operating arm having one end attached to said flexible portion for pivotal movement thereabout, and interiorly located driving connections between said operating arm and said circuit interrupters, said connections providing for operation of said first circuit interrupter when said arm is moved between a first and a second position, and said connections further providing for closing of said second circuit interrupter when said arm is moved past said second position to a third position.

4. A motor controller for use in explosive and corrosive atmospheres comprising, in combination, a manually operated circuit interrupter, other circuit controlling means connected in circuit in series with said interrupter and including an overload protection device requiring manual resetting after overload tripping, a hermetically sealed enclosure within which said interrupter and said other circuit controlling means are located, an operating handle projecting exteriorly of said enclosure, and means located interiorly of said enclosure and operatively connected with said exterior operating handle to provide for opening and closing of said circuit interrupter at will and resetting of said overload device after overload tripping thereof.

5. A motor controller for use in explosive and corrosive atmospheres comprising, in combination, an electromagnetic contactor having an energizing winding, a hermetically sealed enclosure within which said contactor and said energizing winding are located, the gaseous pressure within said enclosure having a normal value which differs from atmospheric pressure, and means for preventing operation of said contactor should said enclosure develop a leak permitting the entrance of the surrounding atmosphere, said means comprising a switch within said enclosure having contacts which are openable when the pressure within said enclosure varies a predetermined amount from the established normal pressure, said contacts being connected in series with said contactor energizing winding.

References Cited in the file of this patent
UNITED STATES PATENTS

| | | |
|---|---|---|
| 1,733,904 | Prince | Oct. 29, 1929 |
| 2,021,454 | Levin | Nov. 19, 1935 |
| 2,302,348 | Rechel | Nov. 17, 1942 |
| 2,677,741 | Martin | May 4, 1954 |